Aug. 6, 1940.  C. C. BALDWIN  2,210,196
PACKAGE FOR MERCHANDISING CHEWING GUM
Filed Nov. 28, 1938
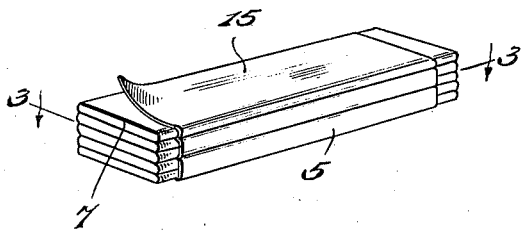
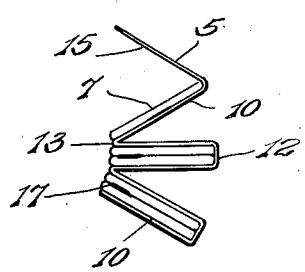
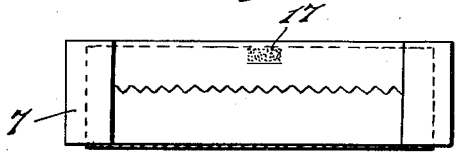
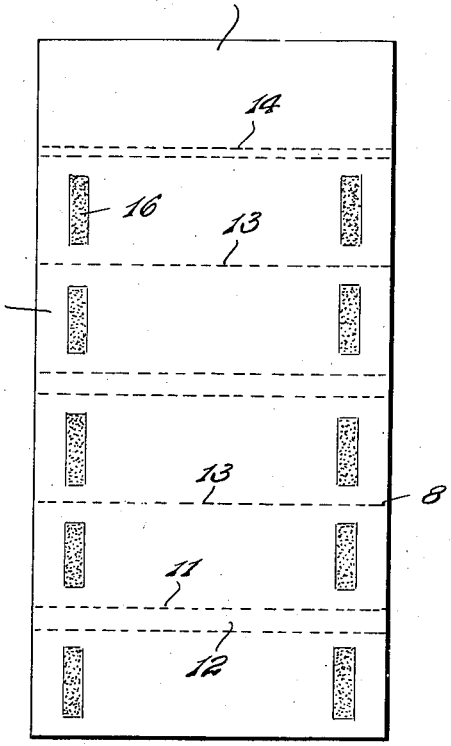
Inventor
Charles C. Baldwin.
By Lacy & Lacy, Attorneys Patented Aug. 6, 1940

2,210,196

UNITED STATES PATENT OFFICE 2,210,196

PACKAGE FOR MERCHANDISING CHEWING GUM

Charles C. Baldwin, St. Louis, Mo.

Application November 28, 1938, Serial No. 242,832

3 Claims. (Cl. 99—180)

This invention relates to packages for merchandising different kinds of commodities and more particularly to a folding or pleated type of package especially designed for vending chewing gum in stick form.

The object of the invention is to provide a merchandising package having a flexible, foldable wrapper or carrier pleated or creased transversely to produce a series of leaves or sections adapted to receive sticks of chewing gum, said carrier being so constructed that, when the same is contracted or closed, the sticks of gum will be disposed side by side in close stacked formation, and when said wrapper or carrier is extended to open position, the several sticks of gum will be conveniently presented to the user for selective or successive detachment from the carrier.

A further object of the invention is to provide a merchandising package, the sticks of gum of which may be secured to the carrier in a manner permitting the detachment of the sticks of gum singly or in pairs or sections and which will permit selective or successive detachment of the sticks of gum when desired without affecting the continuity of the remaining sticks in the package thereby to prevent the unused sticks of gum from becoming separated and lost or otherwise misplaced.

A still further object of the invention is generally to improve this class of devices so as to increase their utility, durability and efficiency as well as to reduce the cost of manufacture.

In the accompanying drawing forming a part of this specification and in which similar numerals of reference indicate corresponding parts in all the figures of the drawing:

Figure 1 is a perspective view of a package of chewing gum embodying the present invention showing the carrier contracted or folded and the sticks of gum in stacked formation for vending purposes.

Figure 2 is an end view showing the carrier in open position to permit the detachment of the sticks of gum therefrom singly or in pairs, Figure 3 is a transverse sectional view taken on the line 3—3 of Figure 1 and showing attached stick of gum having only an inner wrapper, Figure 4 is a plan view of the blank from which the wrapper or carrier is formed, Figure 5 is a perspective view showing a detached single leaf or section of the folder or carrier which serves as an outer strip covering for the attached stick of gum, and Figure 6 is an end view illustrating a modified form of the invention.

In carrying the invention into effect, I provide a suitable pliable wrapper or carrier 5 preferably formed of a single length of paper and made from a blank 6 of the construction shown in Figure 4 of the drawing. The blank from which the carrier is formed is preferably of sufficient length to accommodate five individually wrapped standard sticks of chewing gum 7, said blank being provided with a series of transverse fold lines, perforations or weakened portions 8 to 10 permit the blank to be pleated or folded transversely to form leaves or sections 10 adapted to receive the sticks of chewing gum, as best shown with gum attached in Figure 2 of the drawing. In order that the wrapper or carrier may conform when folded to the thickness of the stick or sticks of gum attached to the different leaves or sections, I form the blank 6 at predetermined intervals in the length thereof with spaced fold lines or perforations 11 defining an intermediate portion 12 of a width sufficient to accommodate two sticks of gum, while at other points in the length of the blank, I provide single fold lines 13 which act as hinges between adjacent gum-receiving sections and permit the sections with the gum attached to be folded flat against each other in stacked formation, as best shown in Figure 1 of the drawing. The upper end of the blank 6 is formed with a pair of transverse perforations or fold lines 14 spaced apart a distance equal to the thickness of a single stick of chewing gum so as to accommodate the adjacent longitudinal edge of the uppermost stick of gum of the pack. The material constituting the blank 6 is extended longitudinally beyond the fold line 14 to form a cover flap 15 which extends over the uppermost stick of gum when the carrier is folded to form a package or stack. That portion of the blank between the several transverse fold or weakened lines is coated at predetermined intervals with suitable adhesive material 16 for the purpose of detachably securing the sticks of gum in position on the carrier. As previously stated, provision is made to permit the detachment of the sticks of gum in pairs, and in order to hold the sticks of each pair against accidental separation, a small quantity of adhesive material 17 is interposed between adjacent sticks, as best shown in Figures 2 and 3 of the drawing.

It will thus be seen that, when the carrier is contracted or folded to closed position, the sticks of gum will be disposed one above the other in superposed relation to form a stack or package which can be conveniently carried in the pocket without danger of accidental separation of the sticks. When it is desired to detach a stick of gum from the carrier, it is merely necessary to elevate the cover flap 15 when the individual sticks of gum in the stack or package will assume the position shown in Figure 2 of the drawing and in which position the uppermost stick of gum may be readily detached therefrom by exerting a slight tearing action on the adjacent line of perforations. It will be understood, however, that, if desired, these perforations may be omitted and the sticks of gum severed from the carrier in any other suitable manner. If it is desired to remove two sticks of gum at a time from the carrier, it is merely necessary to detach one of the sections containing a pair of joined sticks of gum, as will be readily understood, or the joined sticks of gum on the section may be removed one at a time from the carrier by exerting a slight separating action on said sticks of gum preferably at the point of placement of the adhesive material 17 thereon. The flap 15 not only forms a cover for the package of gum so as to give it a neat attractive appearance but said flap and the exterior of the entire wrapper also provide a surface for the display of any suitable advertising matter.

In Figure 6 of the drawing, there is illustrated a modified form of the invention showing the sticks of gum 18 attached to the leaves or sections of the carrier for single or individual detachment, the construction and operation of the device being otherwise similar to that shown in Figure 1 of the drawing.

It will be noted that either form of the invention shown in Figures 1 and 6 of the drawing permits the attachment or use of sticks of gum wrapped only with an inner wrapper, as shown in Figure 3 of the drawing, in the formation of the package, as well as individual sticks of gum having any type inner and outer wrappers, and when sticks of gum having only inner wrappers are used with the carrier shown in Figure 1, then the wrapper or carrier 5 serves a three fold purpose, in that it provides an outer strip covering, similar to that shown in Figure 5 of the drawing, having suitable advertising surface for each individual stick of gum when detached, and at the same time reduces the cost of said outer wrapper, as well as providing a suitable wrapper for the package as a whole.

It will thus be seen that there is provided a merchandising package in which the carrier for the sticks of gum is so folded or pleated as to permit the carrier to be extended to open position to permit the selective or successive detachment of the sticks of gum or moved to closed or contracted position and in which latter position the sticks of gum will be arranged in stacked formation so that the package can be conveniently carried in the pocket. It will also be noted that both forms of the device permit the successive detachment of the individual sticks of gum without disturbing the continuity of the remaining sticks so that liability of the unused sticks of gum becoming accidentally separated and lost is reduced to a minimum.

Having thus described the invention, what is claimed as new is:

1. A merchandising package including an extensible and contractible carrier formed of transversely severable sections, individually wrapped sticks of gum adhesively secured to the carrier at said sections and foldable with the carrier to closed position to form a stack, said sticks of gum together with the adjacent sections being successively detachable from said carrier when the latter is extended without disturbing the remaining sticks of gum.

2. A merchandising package including an extensible and contractible carrier pleated transversely to provide a plurality of independent sections connected by weakened portions and, individually wrapped sticks of chewing gum having adhesive engagement with said sections and movable with the carrier to closed position to form a stack, said sticks of chewing gum together with the adjacent sections being detachable from the carrier at the weakened portions thereof when the carrier is extended without disturbing the remaining sticks and each detachable section of the carrier forming a covering for one side of the adjacent detached stick of gum.

3. A merchandising package including an extensible and contractible carrier provided with transverse fold lines defining severable sections, and individually wrapped sticks of gum adhesively secured to the carrier at said sections and detachable together with the adjacent sections from said carrier when the latter is extended without disturbing the remaining sticks of gum, certain of the sections being provided with two sticks of gum intimately united together, said carrier together with the sticks of gum being movable to contracted position to form a stack and one end of the carrier being extended beyond the adjacent fold lines to form a closure flap.

CHARLES C. BALDWIN.